US012666297B2

(12) United States Patent
Chen et al.

(10) Patent No.: US 12,666,297 B2
(45) Date of Patent: Jun. 23, 2026

(54) METHOD AND DEVICE FOR WIRELESS COMMUNICATION

(71) Applicant: APOGEE NETWORKS, LLC, Plano, TX (US)

(72) Inventors: Yu Chen, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 285 days.

(21) Appl. No.: 18/434,692

(22) Filed: Feb. 6, 2024

(65) Prior Publication Data

US 2024/0284224 A1     Aug. 22, 2024

(30) Foreign Application Priority Data

Feb. 17, 2023     (CN) .......................... 202310134808.8

(51) Int. Cl.
| | |
|---|---|
| *H04W 24/10* | (2009.01) |
| *H04B 17/318* | (2015.01) |
| *H04W 74/04* | (2009.01) |
| *H04W 76/28* | (2018.01) |

(52) U.S. Cl.
CPC .......... *H04W 24/10* (2013.01); *H04B 17/328* (2023.05); *H04W 74/04* (2013.01); *H04W 76/28* (2018.02)

(58) Field of Classification Search
None
See application file for complete search history.

(56) References Cited

U.S. PATENT DOCUMENTS

2022/0086741 A1*    3/2022    Liao .......................... G08G 5/26

* cited by examiner

*Primary Examiner* — Suhail Khan
(74) *Attorney, Agent, or Firm* — Volpe Koenig

(57) ABSTRACT

The present application discloses a method and device for wireless communications, comprising receiving a first signaling, the first signaling being used to configure a first threshold; as a response to any condition in a first condition set being satisfied, executing a first measurement; wherein the first measurement comprises at least one of a layer 3 filtered beam measurement and a cell measurement, two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device. The present application allows for better power saving through the first signaling.

19 Claims, 5 Drawing Sheets

100

Receiving first message
applied to first cell

First time
length

First time
length

First time
length

First time
length

•••• Time

FIG. 7

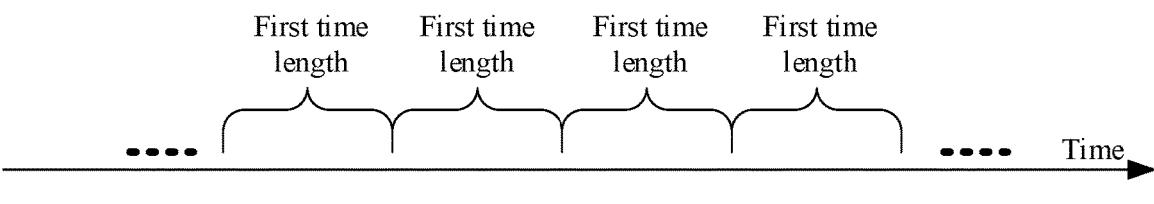

Whether first message applied
to first cell is received being used to determine whether measurement
relaxation is applied

FIG. 8

Whether first message
applied to first cell is received being used to determine

Whether event associated with first
measurement identity is satisfied

FIG. 9

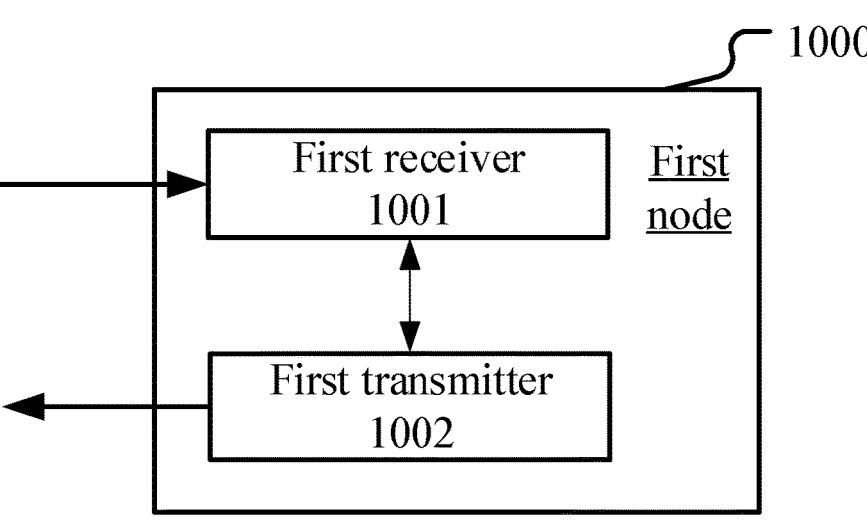

1000

First receiver
1001

First
node

First transmitter
1002

FIG. 10

METHOD AND DEVICE FOR WIRELESS COMMUNICATION

CROSS REFERENCE TO RELATED APPLICATIONS

This application claims the priority benefit of Chinese Patent Application No.202310134808.8, filed on Feb. 17,2023, the full disclosure of which is incorporated herein by reference.

BACKGROUND

Technical Field

The present application relates to transmission methods and devices in wireless communication systems, involving measurement and power saving.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In communications, whether Long Term Evolution (LTE) or 5G NR involves features of accurate reception of reliable information, optimized energy efficiency ratio, determination of information efficiency, flexible resource allocation, scalable system structure, efficient non-access layer information processing, low service interruption and dropping rate and support for low power consumption, which are of great significance to the maintenance of normal communications between a base station and a UE, reasonable scheduling of resources and balancing of system payload. Those features can be called the cornerstone of high throughout and are characterized in meeting communication requirements of various service, improving spectrum utilization and improving service quality, which are indispensable in enhanced Mobile BroadBand (eMBB), Ultra Reliable Low Latency Communications (URLLC) and enhanced Machine Type Communications (eMTC). Meanwhile, in the following communication modes, covering Industrial Internet of Things (IIoT), Vehicular to X (V2X), Device to Device communications, Unlicensed Spectrum communications, User communication quality monitoring, network planning optimization, Non-Territorial Networks (NTN), Territorial Networks (TN), and Dual connectivity system, there are extensive requirements in radio resource management and selection of multi-antenna codebooks as well as in signaling design, adjacent cell management, service management and beamforming. Transmission methods of information are divided into broadcast transmission and unicast transmission, both of which are essential for 5G system for that they are very helpful to meet the above requirements. The UE can be connected to the network directly or through a relay.

With the increase of scenarios and complexity of systems, higher requirements are raised for interruption rate and time delay reduction, reliability and system stability enhancement, service flexibility and power saving. At the same time, compatibility between different versions of different systems should be considered when designing the systems.

3GPP standardization organization has done relevant standardization work for 5G and formed a series of standards. The standard contents can be referred to:

https://www.3gpp.org/ftp/Specs/archive/38_series/38.133/38133-h00.zip https://www.3gpp.org/ftp/Specs/archive/38_series/38.213/38213-h00.zip https://www.3gpp.org/ftp/Specs/archive/38_series/38.321/38321-h00.zip https://www.3gpp.org/ftp/Specs/archive/38_series/38.331/38331-h00.zip https://www.3gpp.org/ftp/Specs/archive/38_series/38.304/38304-h00.zip

SUMMARY

Measurement is a very important function in wireless communication systems, but unnecessary measurement will bring some disadvantages, such as power consumption, increasing the complexity, incurring the impact to the normal communications, on the other hand, if the measurement is not carried out, there are also some problems, such as the inability to keep track of the channel environment in time, which will also adversely affect the communications, and even dropouts, so how to trigger the execution of the measurement is a problem that needs to be solved. Researchers found that if signal quality of the SpCell is good enough, i.e., when RSRP (Reference Signal Receiving Power) of the SpCell does not fall below a first threshold, no measurement can be performed. Researchers further found that determining whether to perform measurements based solely on whether RSRP of the SpCell is lower than a first threshold can also be problematic, such as lacking flexibility. There are some scenarios where it is desirable to perform the measurement to increase flexibility even if the RSRP of the SpCell is not below a first threshold, in such scenarios it can be determined by whether a first message applied to the SpCell is received, which makes the measurement control more optimal. Researchers further found that the first message also faces problems in terms of efficiency and performance, including efficiency and performance trade-offs, e.g., the use of unicast is not as efficient as non-unicast, and the use of messages that can be supported by legacy devices may have an impact on legacy devices; therefore, the first message needs to be transmitted in a non-unicast manner and/or messages that cannot be supported by legacy devices are used to achieve the appropriate benefits.

To address the above problem, the present application provides a solution.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict. At the same time, the method proposed in the present application can also be used to solve other problems in communications.

The present application provides a method in a first node for wireless communications, comprising:

receiving a first signaling, the first signaling being used to configure a first threshold; and as a response to any condition in a first condition set being satisfied, executing a first measurement;

herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, a problem to be solved in the present application comprises: how to trigger an execution of a first measurement; which conditions can trigger an execution of a first measurement; how to determine or trigger an execution of measurement based on a first threshold, and how to add flexibility to meet multiple scenarios, e.g., measurements can be performed even when RSRP of an SpCell is not less than a first threshold; how to determine to execute a measurement based on receiving a first message applied to a first cell; how to improve the efficiency of a first message and how to reduce the impact of the first message on legacy users; how to save power.

In one embodiment, advantages of the above method comprise: increased flexibility, support for richer scenarios, power savings, reduced impact of measurements on communications, avoidance of dropped calls and service interruptions, improved efficiency of message transmission, and avoidance of interference with legacy users.

Specifically, according to one aspect of the present application, the first message is used to indicate that the first cell stops data transmission based on dynamic scheduling within at least one time window.

Specifically, according to one aspect of the present application, the first message is used to indicate that the first cell does not transmit a first system information block within at least one first time length;

herein, when the first message is not applied to the first cell, the first cell transmits the first system information block at least once within a first time length; the first system information block is system information block 1, or the first system information block is a main system information block.

Specifically, according to one aspect of the present application, the first message is used to indicate that the first cell enters a network energy saving state.

Specifically, according to one aspect of the present application, the first message is used to indicate that the first cell uses at least one of discontinuous transmission or discontinuous reception.

Specifically, according to one aspect of the present application, a second signaling is received, and the second signaling is used for conditional reconfiguration; the second signaling comprises a first RRC message and a first measurement identity; the receiving a second signaling comprises storing the first RRC message; an execution of the first RRC message depends on the first measurement identity;

herein, the meaning that an execution of the first RRC message depends on the first measurement identity comprises: when an event associated with the first measurement identity is satisfied, the stored first RRC message is executed; whether the first message applied to the first cell is received is used to determine whether the event associated with the first measurement identity is satisfied.

Specifically, according to one aspect of the present application, whether the first message applied to the first cell is received is used to determine whether measurement relaxation is applied.

Specifically, according to one aspect of the present application, the first node is an Internet of Things IoT) terminal.

Specifically, according to one aspect of the present application, the first node is a UE.

Specifically, according to one aspect of the present application, the first node is a relay.

Specifically, according to one aspect of the present application, the first node is an access network device.

Specifically, according to one aspect of the present application, the first node is a vehicle terminal.

Specifically, according to one aspect of the present application, the first node is an aircraft.

Specifically, according to one aspect of the present application, the first node is a mobile phone.

The present application provides a method in a second node for wireless communications, comprising:

transmitting a first signaling, the first signaling being used to configure a first threshold; and a receiver of the first signaling, as a response to any condition in a first condition set being satisfied, executing a first measurement;

herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

Specifically, according to one aspect of the present application, the first message is used to indicate that the first cell stops data transmission based on dynamic scheduling within at least one time window.

Specifically, according to one aspect of the present application, the first message is used to indicate that the first cell does not transmit a first system information block within at least one first time length;

herein, when the first message is not applied to the first cell, the first cell transmits the first system information block at least once within a first time length; the first system information block is system information block 1, or the first system information block is a main system information block.

Specifically, according to one aspect of the present application, the first message is used to indicate that the first cell enters a network energy saving state.

Specifically, according to one aspect of the present application, the first message is used to indicate that the first cell uses at least one of discontinuous transmission or discontinuous reception.

Specifically, according to one aspect of the present application, a second signaling is transmitted, and the second signaling is used for conditional reconfiguration; the second signaling comprises a first RRC message and a first measurement identity; an execution of the first RRC message depends on the first measurement identity;

herein, the meaning that an execution of the first RRC message depends on the first measurement identity comprises: when an event associated with the first measurement identity is satisfied, the stored first RRC message is executed; whether the first message applied to the first cell is received is used to determine whether the event associated with the first measurement identity is satisfied.

Specifically, according to one aspect of the present application, whether the first message applied to the first cell is received is used to determine whether measurement relaxation is applied.

Specifically, according to one aspect of the present application, the second node is a network device.

Specifically, according to one aspect of the present application, the second node is a base station.

Specifically, according to one aspect of the present application, the second node is a relay.

Specifically, according to one aspect of the present application, the second node is an access point.

Specifically, according to one aspect of the present application, the second node is an aircraft.

Specifically, according to one aspect of the present application, the second node is a satellite.

The present application provides a first node for wireless communications, comprising:

a first receiver, receiving a first signaling, the first signaling being used to configure a first threshold; and the first receiver, as a response to any condition in a first condition set being satisfied, executing a first measurement;

herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

The present application provides a second node for wireless communications, comprising:

a second transmitter, transmitting a first signaling, the first signaling being used to configure a first threshold; and a receiver of the first signaling, as a response to any condition in a first condition set being satisfied, executing a first measurement;

herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, the present application has the following advantages over conventional schemes:

more flexibility, supporting more scenarios, the network can flexibly and dynamically control how to trigger the execution of measurement, and the signaling overhead is also relatively small.

more power saving, which can save both the power of the terminal and the power of the network.

it is possible to start executing measurement quickly when the network indication is obtained, i.e. when the first message is received, which facilitates mobility management, e.g. timely switching, avoiding service interruptions or service quality degradation.

BRIEF DESCRIPTION OF THE DRAWINGS

Other features, objects and advantages of the present application will become more apparent from the detailed description of non-restrictive embodiments taken in conjunction with the following drawings:

FIG. 7 illustrates a schematic diagram of a transmission of a system information block according to one embodiment of the present application;

FIG. 8 illustrates a schematic diagram of whether a first message applied to a first cell is received is used to determine whether a measurement relaxation is applied according to one embodiment of the present application;

FIG. 9 illustrates a schematic diagram of whether a first message applied to a first cell is received is used to determine whether an event associated with a first measurement identity is satisfied according to one embodiment of the present application;

FIG. 10 illustrates a schematic diagram of a processor in a first node according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
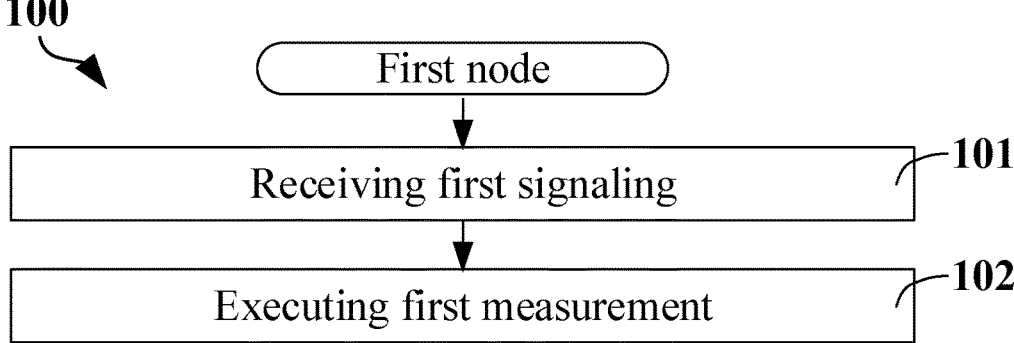
FIG. 1 illustrates a flowchart of receiving a first signaling and executing a first measurement according to one embodiment of the present application.

Embodiment 1 illustrates a flowchart of receiving a first signaling and executing a first measurement according to one embodiment of the present application, as shown in FIG. 1. In FIG. 1, each box represents a step, it should be particularly noted that the sequence order of each box herein does not imply a chronological order of steps marked respectively by these boxes.

In Embodiment 1, the first node in the present application receives a first signaling in step 101; and executes a first measurement in step 102.

herein, the first signaling is used to configure a first threshold; any condition in a first condition set is met to trigger the first measurement; the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, the first node is a User Equipment (UE).

In one embodiment, the first node is in RRC_CONNECTED state.

In one embodiment, the method proposed in the present application is not related to sidelink communications.

In one embodiment, the method proposed in the present application is applied to direct communications between the terminal and the network.

In one embodiment, a serving cell refers to a cell where a UE resides; executing a cell search comprises: a UE searches for a suitable cell of a selected Public Land Mobile Network (PLMN) or a Stand-alone Non-Public Network (SNPN), selects the suitable cell to provide available services, and monitors a control channel of the suitable cell, and this procedure is defined as camping on a cell; that is, a camped cell is a serving cell of the UE relative to the UE. Advantages of camping on a cell in RRC_IDLE state or RRC_INACTIVE state: enabling the UE to receive a system message from the PLMN or the SNPN; after registration, if the UE wishes to establish an RRC connection or continue a suspended RRC connection, the UE can achieve this by executing an initial access on a control channel of residing camping cell; the network may page the UE; so that the UE can receive notifications of Earthquake and Tsunami Warning System (ETWS) and Commercial Mobile Alert System (CMAS).

In one embodiment, for a UE in RRC_CONNECTED state that is not configured with carrier aggregation/dual connectivity (CA/DC), only one serving cell comprises a PCell; if a UE is only connected to one cell, then this cell is a main cell of UE. For a UE in RRC_CONNECTED state that is configured with CA/DC, a serving cell is used to indicate a cell set comprising a Special Cell (SpCell) and all sub-cells. The PCell is a cell in a Master Cell Group (MCG), which works at primary frequency, and the UE executes an initial connection establishment procedure or initiates a connection re-establishment on the PCell. For a dual connectivity operation, a Secondary Cell Group (SCG) refers to a PCell of an MCG or a Primary SCG Cell (PSCell) of an SCG; if it is not a dual connectivity operation, an SpCell refers to a PCell.

In one embodiment, a frequency at which a Secondary Cell (SCell) operates is sub-frequency.

In one embodiment, an individual content of an information element is called a field.

In one embodiment, a Multi-Radio Dual Connectivity (MR-DC) refers to a dual connectivity between an E-UTRA and an NR node, or a dual connectivity between two NR nodes.

In one embodiment, in MR-DC, a radio access node providing a control-plane connection to the core network is a master node, and the master node may be a master eNB, a master ng-eNB, or a master gNB.

In one embodiment, an MCG refers to, in MR-DC, a group of serving cells associated with a master node, comprising an SpCell, and optionally one or multiple SCells.

In one embodiment, a PCell is an SpCell of an MCG.

In one embodiment, a PSCell is an SpCell of an SCG.

In one embodiment, in MR-DC, a control plane connection to the core network is not provided, and a radio access node providing extra resources to the UE is a sub-node. The sub-node can be an en-gNB, a sub-ng-eNB or a sub-gNB.

In one embodiment, in MR-DC, a group of serving cells associated with a sub-node is a Secondary Cell Group (SCG), comprising an SpCell and, optionally, one or multiple SCells.

In one embodiment, the first node is configured with at least an MCG.

In one subembodiment of the embodiment, an MCG of the first node comprises at least one SCell.

In one subembodiment of the embodiment, an MCG of the first node does not comprise an SCell.

In one embodiment, the first node is configured with an MCG and an SCG.

In one subembodiment of the embodiment, an MCG of the first node comprises at least one SCell.

In one subembodiment of the embodiment, an SCG of the first node comprises at least one SCell.

In one embodiment, an RRC information block refers to an information element in an RRC message.

In one embodiment, SSB can be referred to as SS \PBCH, or SS block.

In one embodiment, an RRC information block can comprise one or more RRC information blocks.

In one embodiment, an RRC information block may not comprise any RRC information block, but only comprise at least one parameter.

In one embodiment, a radio bearer comprises at least a signaling radio bearer and a data radio bearer.

In one embodiment, a radio bearer comprises a MBS (multicast broadcast service) radio bearer.

In one embodiment, a radio bearer is services or an interface of services provided by the PDCP layer to the higher layer.

In one subembodiment of the above embodiment, the higher layer comprises one of the RRC layer, the NAS layer, and the SDAP layer.

In one embodiment, a signaling radio bearer is services or an interface of services for signaling transmission provided by the PDCP to the higher layer.

In one subembodiment of the above embodiment, the higher layer comprises at least a former of the RRC layer and the NAS.

In one embodiment, a data radio bearer is services or an interface of services for data transmission provided by the PDCP to the higher layer.

In one subembodiment of the above embodiment, the higher layer comprises at least a former of the SDAP layer and the NAS.

In one embodiment, the first signaling is an RRC signaling.

In one embodiment, the first signaling is transmitted by unicast.

In one embodiment, the first signaling is transmitted through a DCCH (dedicated control channel).

In one embodiment, the first signaling is transmitted to the first node through a dedicated method.

In one embodiment, the first signaling is transmitted to the first node through SRB1.

In one embodiment, the first signaling uses encryption.

In one embodiment, the first signaling is a signaling supported by the legacy device.

In one embodiment, a signaling supported by the legacy device is a signaling prior to 3GPP release 18.

In one embodiment, a signaling supported by the legacy device is a signaling of 3GPP release 17 or prior to release 17.

In one embodiment, a signaling supported by the legacy device is a signaling supported by the device produced before the submission of the present application.

In one embodiment, the first signaling is or comprises an RRCReconfiguration message.

In one embodiment, the first signaling is used to configure a measurement.

In one embodiment, the first signaling comprises MeasConfig, and the MeasConfig is used to configure the first threshold.

In one embodiment, the first threshold comprised in the first signaling is applicable to all measurement objects configured by MeasConfig comprised in the first signaling.

In one embodiment, the first threshold comprised in the first signaling is applicable to only partial measurement objects configured by MeasConfig comprised in the first signaling.

In one embodiment, MeasConfig comprised in the first signaling comprises at least one measurement object.

In one embodiment, a measurement object is used to configure at least one of measured frequency, subcarrier spacing, reference signal resources, and measurement timing configurations.

In one subembodiment of the embodiment, the reference signal resource comprises an SSB resource.

In one subembodiment of the embodiment, the reference signal resource comprises a CSI-RS resource.

In one embodiment, each measurement object configured by MeasConfig comprised in the first signaling has a measurement object identity.

In one embodiment, MeasConfig comprised in the first signaling comprises at least one report configuration.

In one embodiment, each report configuration comprised in MeasConfig comprised in the first signaling has a report configuration identity.

In one embodiment, each report configuration comprised in MeasConfig comprised in the first signaling comprises a type of a report, and the type of the report is periodic or event triggered.

In one embodiment, MeasConfig comprised in the first signaling is used to configure at least one measurement identity, and the measurement identity is used to identify a measurement.

In one embodiment, a MeasIdToAddModList comprised in the MeasConfig comprised in the first signaling is used to configure the at least one measurement identity.

In one embodiment, the first measurement is a measurement, and the at least one measurement identity configured by MeasConfig comprised in the first signaling comprises an identity of the first measurement.

In one embodiment, each item in MeasIdToAddModList comprised in a MeasConfig comprised in the first signaling comprises a measurement identity, a measurement object identity, and a report configuration identity.

In one subembodiment of the embodiment, each item in MeasIdToAddModList comprised in MeasConfig comprised in the first signaling is associated with the measurement identity, the measurement object identity, and the report configuration identity.

In one embodiment, the first signaling is not configured a measurement slot.

In one embodiment, a measurement gap configuration is not setup.

In one embodiment, the first node does not need to measure a gap to execute the behavior of obtaining the first measurement result.

In one embodiment, a measurement object associated with the first measurement is used to configure co-frequency measurement.

In one embodiment, a measurement object associated with the first measurement does not require a measurement gap.

In one embodiment, the first signaling explicitly indicates the first threshold.

In one embodiment, MeasConfig configuration comprised in the first signaling comprises the first threshold.

In one embodiment, s-MeasuraeConfig in MeasConfig comprised in the first signaling is used to configure the first threshold.

In one embodiment, the first threshold is ssb-RSRP or csi-RSRP.

In one embodiment, the first threshold is ssb-RSRP, corresponding to a cell RSRP based on an SS/PBCH (synchronization signal/physical broadcast channel)

In one subembodiment of the above embodiment, RSRP of the first cell after layer 3 filtering is cell RSRP based on an SS/PBCH.

In one embodiment, the first threshold is csi-RSRP, corresponding to cell RSRP based on a CSI-RS (channel state information reference signal).

In one subembodiment of the above embodiment, RSRP of the first cell after layer 3 filtering is cell RSRP based on a CSI-RS.

In one embodiment, the first threshold is an RSRP interval.

In one embodiment, a value range for the first threshold is an integer ranging from 0 to 127.

In one embodiment, the meaning of the phrase of as a response to any condition in a first condition set being satisfied, executing a first measurement comprises: when any condition in the first condition set is satisfied, executing the first measurement.

In one embodiment, the meaning of the phrase of as a response to any condition in a first condition set being satisfied, executing a first measurement comprises: any condition in the first condition set being met triggers an execution of the first measurement.

In one embodiment, the meaning of the phrase of as a response to any condition in a first condition set being satisfied, executing a first measurement comprises: only when any condition in the first condition set is satisfied, executing the first measurement.

In one embodiment, the meaning of the phrase of as a response to any condition in a first condition set being satisfied, executing a first measurement comprises: an execution of the first measurement requires any condition in the first condition set to be satisfied.

In one embodiment, the meaning of the phrase of as a response to any condition in a first condition set being satisfied, executing a first measurement comprises: any condition in the first condition set being satisfied is a necessary condition for executing the first measurement.

In one embodiment, a measurement configured by the first signaling is stored in VarMeasConfig.

In one embodiment, an identity of the first measurement is comprised in measIdList in VarMeasConfig.

In one embodiment, executing a first measurement comprises receiving a signal on a reference signal resource configured by a measurement object associated with the first measurement and assessing quality of a signal.

In one embodiment, executing a first measurement comprises obtaining a result of a beam measurement of layer 3 filtering.

In one embodiment, executing a first measurement comprises obtaining a result of a cell measurement.

In one embodiment, the first measurement is for a non-serving cell.

In one embodiment, the first measurement is for a neighboring cell.

In one embodiment, the first measurement only comprises a former of a beam measurement of layer 3 filtering and a cell measurement.

In one embodiment, the first measurement comprises only a latter of a beam measurement of layer 3 filtering and a cell measurement.

In one embodiment, the first measurement comprises a beam measurement of layer 3 filtering and a cell measurement.

In one embodiment, the beam measurement of layer 3 filtering is achieved by filtering a beam measurement result by using layer 3 filter.

In one embodiment, the layer 3 measurement is a measurement where a layer 3 filter is used.

In one embodiment, the layer 3 filter can be defined as: $F_n=(1-a)*F_{n-1}+a*M_n$, where $F_n$ is a measurement result of an updated filter; $M_n$ is a latest measurement result received from the physical layer; $F_{n-1}$ is a measurement result of the old filtering, where $F_0$ is set to $M_1$; a is a fixed or a is configurable, e.g. a=0.5, e.g. $a=1/2^{(ki/4)}$, where ki is configured by the first signaling, e.g. it may be configured as 1.

In one embodiment, the cell measurement is obtained from measurements of one or more beams.

In one subembodiment of the embodiment, a result of the cell measurement may be equal to a best beam measurement or equal to an average of measurement results of multiple beams.

In one subembodiment of the embodiment, whether the cell measurement is obtained by one or multiple beams is based on the implementation of the terminal.

In one subembodiment of the embodiment, whether the cell measurement is obtained by one or multiple beams is based on the configuration of the network.

In one embodiment, the first signaling is used to configure whether the first measurement comprises a beam measurement of layer 3 filtering or a cell measurement.

In one embodiment, the first signaling is used to configure the first measurement to comprise both a beam measurement of layer 3 filtering and a cell measurement.

In one embodiment, RSRP of the first cell after filtering of layer 3 belongs to a cell measurement of the first cell.

In one embodiment, RSRP of the first cell after filtering of layer 3 belongs to a cell RSRP of the first cell.

In one embodiment, the first measurement is a measurement of a cell other than the first cell.

In one embodiment, the first measurement is a measurement of a beam of a cell other than the first cell.

In one embodiment, the first message is broadcast.

In one embodiment, the first message is multicast.

In one embodiment, the first message is an RRC message.

In one subembodiment of the above embodiment, the first message does not use SRB1.

In one embodiment, the first message is or comprises a field of an RRC message.

In one embodiment, the first message is MAC CE (MAC control element).

In one embodiment, the first message may comprise a field of MAC CE.

In one embodiment, the first message is Downlink control information (DCI).

In one embodiment, the first message is or comprises a field of DCI.

In one embodiment, the first message is scrambled by an RNTI other than a C-RNTI.

In one embodiment, the first message is not encrypted.

In one embodiment, the first message is non-unicast.

In one subembodiment of the embodiment, the first message is not supported by the legacy device.

In one subembodiment of the embodiment, the first message is supported by the legacy device.

In one embodiment, the first message is not supported by the legacy device.

In one subembodiment of the embodiment, the first message is unicast.

In one subembodiment of the embodiment, the first message is non-unicast.

In one embodiment, the first message is or comprises a system information block.

In one embodiment, the first message is or comprises a field in a system information block.

In one embodiment, the first message is or comprises system information block 1.

In one embodiment, the first message is or comprises a field in system information block 1.

In one embodiment, the first message is or comprises system information block 1 after the release of 3GPP 17.

In one embodiment, the legacy device refers to a device prior to 3GPP Release 18.

In one embodiment, the legacy device is referred to as supporting only releases prior to 3GPP Release 18.

In one embodiment, the legacy device refers to a device that was manufactured prior to the filing date of the present application.

In one embodiment, the legacy device refers to a device that does not support a method proposed in the present application.

In one embodiment, the legacy device refers to a device that does not support the first message.

In one embodiment, the legacy device referred to an old device.

In one embodiment, the legacy device refers to a device that only support older versions of protocols.

In one embodiment, the legacy device refers to devices that only support protocols prior to the 3GPP release 18.

In one embodiment, the meaning of the phrase that the first message is not supported by a legacy device is or comprises: the first message is only supported or comprised by 3GPP release 18 or releases after 3GPP release 18.

In one embodiment, the meaning of the phrase that the first message is not supported by a legacy device is or comprises: the first message is not supported or comprised by releases prior to 3GPP release 18.

In one embodiment, a name of the first message comprises-r18.

In one embodiment, a name of the first message comprises-r19.

In one embodiment, a name of the first message comprises-r20.

In one embodiment, a name of the first message comprises-rn, where n is an integer greater than 17.

In one embodiment, a name of the first message does not comprise-r17.

In one embodiment, a name of the first message does not comprise-r16.

In one embodiment, a name of the first message does not comprise-r15.

In one embodiment, the meaning of the phrase of receiving a first message applied to a first cell comprises: the first message is applied to the first cell.

In one embodiment, the meaning of the phrase of receiving a first message applied to a first cell comprises: the first message is for the first cell.

In one embodiment, the meaning of the phrase of receiving a first message applied to a first cell comprises: the first message indicates that the first cell enters a first state.

In one embodiment, the meaning of the phrase of receiving a first message applied to a first cell comprises: the first message indicates a transmission method or transmission mode of the first cell.

In one embodiment, the first state is related to network power saving.

In one embodiment, the first state is related to different signal transmission methods.

In one embodiment, the first state is related to different signal reception methods.

In one embodiment, the first state is related to transmission and/or reception methods of different reference signals.

In one embodiment, the first state is related to whether dynamic scheduling is supported.

In one embodiment, the first state is related to different allocation methods of reference signal resources.

In one embodiment, the first state is related to different transmit power.

In one embodiment, the first state is related to transmission frequency of different broadcast signals.

In one embodiment, the first state is related to whether a broadcast signal is transmitted.

In one embodiment, the first state is related to whether an SSB (synchronization signal block) is transmitted.

In one embodiment, the first state is related to whether SIB1 (System Information Block 1) is transmitted.

In one embodiment, the first state is unrelated to whether a single terminal is in an active time of a DRX group.

In one embodiment, the first state is related to a transmission mode of a PDCCH.

In one embodiment, a feature of a cell being in the first state comprises that the cell turns off data transmission based on dynamic scheduling.

In one embodiment, a feature of a cell being in the first state comprises that the cell stops dynamic scheduling.

In one embodiment, a feature of a cell being in the first state comprises that the cell stops any transmission.

In one embodiment, a feature of a cell being in the first state comprises that the cell stops transmission of any data.

In one embodiment, a feature of a cell being in the first state comprises that the cell stops semi-persistent scheduling.

In one embodiment, the first state is a state of network energy saving.

In one embodiment, the first state is a DTX (discontinuous transmission) state of a cell.

In one embodiment, the first state is a state when a DTX of a cell is inactive.

In one embodiment, the first state is a DRX state of a cell.

In one embodiment, the first state is a state when a DRX of a cell is inactive.

In one embodiment, the first state is a DRX and a DTX state of a cell.

In one embodiment, the first state is a non-receiving and/or non-transmitting state of the cell.

In one embodiment, the first message indicates that the first cell adopts another transmission mode.

In one embodiment, the first message indicates that the first cell adopts another configuration or pre-configuration.

In one subembodiment of the embodiment, the another configuration or pre-configuration is related to reducing transmit power.

In one subembodiment of the embodiment, the another configuration or pre-configuration is related to less resource usage.

In one subembodiment of the embodiment, the another configuration or pre-configuration is related to discontinuous transmission.

In one subembodiment of the embodiment, the another configuration or pre-configuration is related to limiting transmission.

In one embodiment, the first message indicates that the first cell adopts another cell state.

In one subembodiment of the embodiment, the another cell state is the first cell state.

In one embodiment, a size of the first message is 0.

In one embodiment, the first message is applied to a cell group, and the first cell is a cell in the cell group.

In one embodiment, the first message is used to indicate that the first cell stops data transmission based on dynamic scheduling within at least one time window.

In one embodiment, the first message indicates the at least one time window.

In one embodiment, the first signaling indicates the at least one time window, and the first message indicates an application or activation of the at least one time window.

In one embodiment, one of the first message or the first signaling indicates a number of the at least one time window.

In one embodiment, one of the first message or the first signaling indicates a length of each time window in the at least one time window.

In one embodiment, one of the first message or the first signaling indicates a time interval between two adjacent time windows in the at least one time window.

In one embodiment, a time interval between two adjacent time windows in the at least one time window is equal.

In one embodiment, a time interval between two adjacent time windows in the at least one time window is a first time interval, a time interval between the other two adjacent time windows is a second time interval, and the first time interval is not equal to the second time interval.

In one embodiment, a length of each time window in the at least one of the time windows is equal.

In one embodiment, the at least one time window comprises two time windows with unequal length.

In one embodiment, a start of a time window in the at least one time window is related to a transmission time of a system information block.

In one embodiment, a start of a time window in the at least one time window is related to a transmission time of system information block1.

In one embodiment, a start of a time window in the at least one time window is related to a transmission time of a main system information block.

In one embodiment, a time window in the at least one time window is periodic.

In one embodiment, the second signaling indicates a period of the at least one time window.

In one embodiment, any two time windows in the at least one time window are discontinuous in time domain.

In one embodiment, a length of any time window in the at least one of time window is finite.

In one embodiment, any time window in the at least one time window comprises N1 slot(s).

In one embodiment, any time window in the at least one time window comprises N2 subframe(s).

In one embodiment, any time window in the at least one time window comprises N3 frame(s).

In one embodiment, any time window in the at least one time window comprises N4 milisecond(s).

In one embodiment, the N1, N2, N3, and N4 are positive integers.

In one embodiment, the first signaling or first message indicates one of N1, N2, N3, and N4.

In one embodiment, in any time window in the at least one of the time window, the cell enters the first state.

In one embodiment, a transmission time of SIB1 of the first cell is used to determine the at least one time window.

In one embodiment, an earliest time window in the at least one time window begins upon a reception of the first message.

In one embodiment, an earliest time window in the at least one time window starts at x time unit(s) after a reception of the first message.

In one subembodiment of the above embodiment, x is a positive integer.

In one subembodiment of the above embodiment, x time unit(s) is(are) x millisecond(s).

In one subembodiment of the above embodiment, x time unit(s) is(are) x slot(s).

In one subembodiment of the above embodiment, x time unit(s) is(are) x subframe(s).

In one subembodiment of the above embodiment, x time unit(s) is(are) x frame(s).

In one subembodiment of the above embodiment, x time unit(s) is(are) x symbol(s).

In one subembodiment of the above embodiment, the first message indicates the x.

In one embodiment, the first message is used to indicate that the first cell stops data transmission based on dynamic scheduling.

In one embodiment, the first message is used to indicate that the first cell stops data transmission based on dynamic scheduling after x time unit(s).

In one subembodiment of the above embodiment, x is a positive integer.

In one subembodiment of the above embodiment, x time unit(s) is(are) x millisecond(s).

In one subembodiment of the above embodiment, x time unit(s) is(are) x slot(s).

In one subembodiment of the above embodiment, x time unit(s) is(are) x subframe(s).

In one subembodiment of the above embodiment, x time unit(s) is(are) x frame(s).

In one subembodiment of the above embodiment, x time unit(s) is(are) x symbol(s).

In one subembodiment of the above embodiment, the first message indicates the x.

In one embodiment, the first message is used to indicate that the first cell does not transmit a first system information block within at least one first time length;

herein, when the first message is not applied to the first cell, the first cell transmits the first system information block at least once within a first time length; the first system information block is system information block 1, or the first system information block is a main system information block.

In one embodiment, the first time length is 160 ms.

In one subembodiment of the embodiment, the first system information block is system information block 1.

In one embodiment, the first time length is 40 ms.

In one subembodiment of the embodiment, the first system information block is main system information block.

In one embodiment, the first message is used to indicate reducing transmission of a first system information block.

In one subembodiment of the embodiment, relative to when the first message is not applied to the first cell.

In one embodiment, the first message is used to indicate a decrease in transmission frequency of a first system information block.

In one subembodiment of the embodiment, relative to when the first message is not applied to the first cell.

herein, when the first message is not applied to the first cell, the first cell transmits the first system information block at least once within a first time length; the first system information block is system information block 1, or the first system information block is a main system information block.

In one embodiment, the meaning of the phrase that when the first cell is not applied to the first message comprises: when the first message is not received.

In one embodiment, the meaning of the phrase that when the first cell is not applied to the first message comprises: when the first message is not transmitted.

In one embodiment, the meaning of the phrase that when the first cell is not applied to the first message comprises: when configuration indicated by the first cell is not applied to the first cell.

In one embodiment, the first message is used to indicate that the first cell at least transmits a first system information block within a second time length.

In one embodiment, when the first message is not applied to the first cell, the first cell at least transmits one first system information block within a first time length.

In one embodiment, the first system information block is system information block 1.

In one embodiment, the first system information block is a main system information block.

In one embodiment, the second time length is longer than the first time length.

In one embodiment, the first message is used to indicate that a number of times the first cell transmits a first system information block within a first time length is a first number.

In one embodiment, when the first message is not applied to the first cell, a number of times the first cell transmits a first system information block within a first time length is a second number.

In one embodiment, the first number is less than the second number.

In one embodiment, the first message indicates that the first cell immediately enters a sleep state.

In one embodiment, the first message indicates that the first cell is about to enter a sleep state.

In one embodiment, the first message indicates that the first cell enters a sleep state after x time unit(s).

In one embodiment, the first message indicates a deactivation of a first cell.

In one embodiment, the first message indicates that a first cell is about to be deactivated.

In one embodiment, the first message indicates that a first cell is deactivated after x time unit(s).

In one embodiment, the first message indicates that the first cell enters a network energy saving state.

In one embodiment, the first message indicates that the first cell is about to enter network energy saving state.

In one embodiment, the first message indicates that the first cell enters a network energy saving state after x time unit(s).

In one embodiment, the first message is used to indicate that the first cell uses discontinuous transmission.

In one embodiment, the first message indicates that the first cell uses discontinuous transmission after x time unit(s).

In one embodiment, the first message is used to indicate that the first cell uses discontinuous reception.

In one embodiment, the first message is used to indicate that the first cell uses discontinuous transmission and discontinuous reception.

In one embodiment, the first message indicates that the first cell uses discontinuous reception after x time unit(s).

In one embodiment, the first message is used to indicate that the first cell is about to use discontinuous reception.

In one embodiment, the first message is used to indicate that the first cell is about to use discontinuous transmission and discontinuous reception.

In one embodiment, the first message indicates that the first cell uses discontinuous transmission within at least one time window.

In one embodiment, the first message indicates that the first cell uses discontinuous reception within at least one time window.

In one embodiment, x is a positive integer.

In one embodiment, the first node is configured with measurement relaxation.

In one embodiment, the first node supports and/or has the ability to use measurement relaxation.

In one embodiment, whether the first message applied to the first cell is received is used to determine whether measurement relaxation is applied.

In one embodiment, the meaning of the phrase of whether the first message applied to the first cell is received is used to determine whether measurement relaxation is applied comprises: when the first message applied to the first cell is received, no measurement relaxation is performed; when the first message applied to the first cell is not received, a measurement relaxation is performed.

In one embodiment, the measurement relaxation is for radio link monitoring (RLM).

In one embodiment, the measurement relaxation is for BFD (beam failure recovery).

In one embodiment, the first node transmits a second message to indicate that the first node uses measurement relaxation.

In one embodiment, the meaning of the phrase of using a measurement relaxation comprises: for RLM being in relaxed state.

In one embodiment, the meaning of the phrase of using a measurement relaxation comprises: for BFD being in relaxed state.

In one embodiment, the meaning of the phrase of using a measurement relaxation comprises: for a measurement relaxation state of RLM being true.

In one embodiment, the meaning of the phrase of using a measurement relaxation comprises: for a measurement relaxation state of BFD being true.

In one embodiment, measurement relaxation at rest is used.

In one embodiment, measurement relaxation at low mobility is used.

In one embodiment, measurement relaxation is used in good serving cell quality.

In one embodiment, the first node is in stationary state.

In one embodiment, the first node is in low mobility state.

In one embodiment, the first node is in good serving cell quality.

In one embodiment, the second message is a UEAssistanceInformation message.

Embodiment 2

Figure 2:
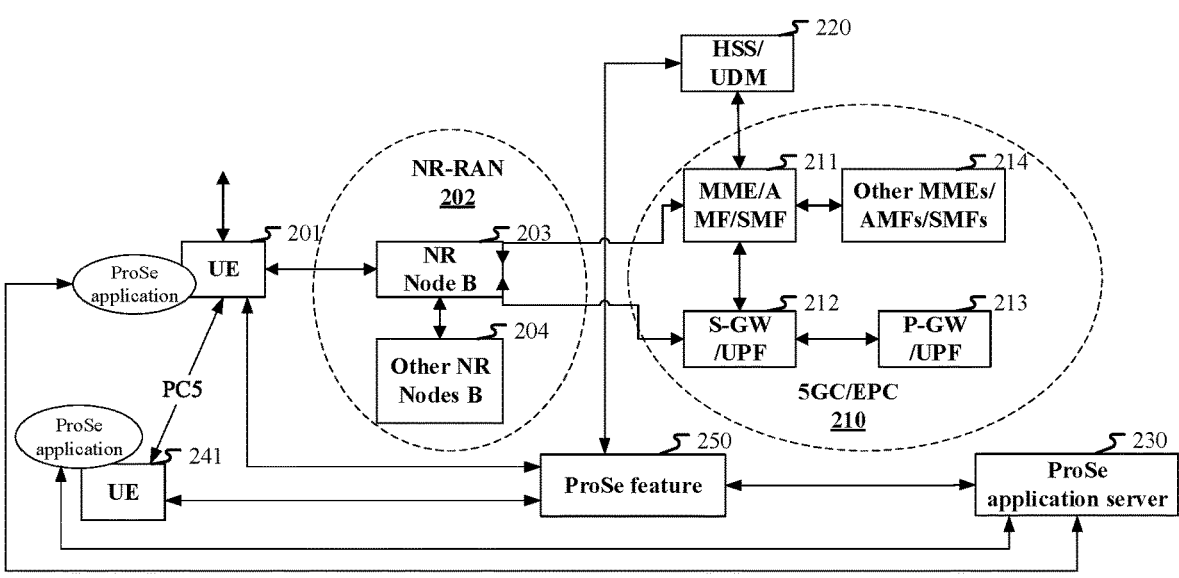
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application is a UE 201.

In one embodiment, a base station of the second node in the present application is a gNB 203.

In one embodiment, a wireless link between the UE 201 and NR node B is an uplink.

In one embodiment, a wireless link between NR node B and UE 201 is a downlink.

In one embodiment, the UE 201 supports relay transmission.

In one embodiment, the UE 201 comprises a mobile phone.

In one embodiment, the UE 201 is a vehicle comprising a car.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a flight platform.

In one embodiment, the gNB 203 is satellite equipment.

Embodiment 3

Figure 3:
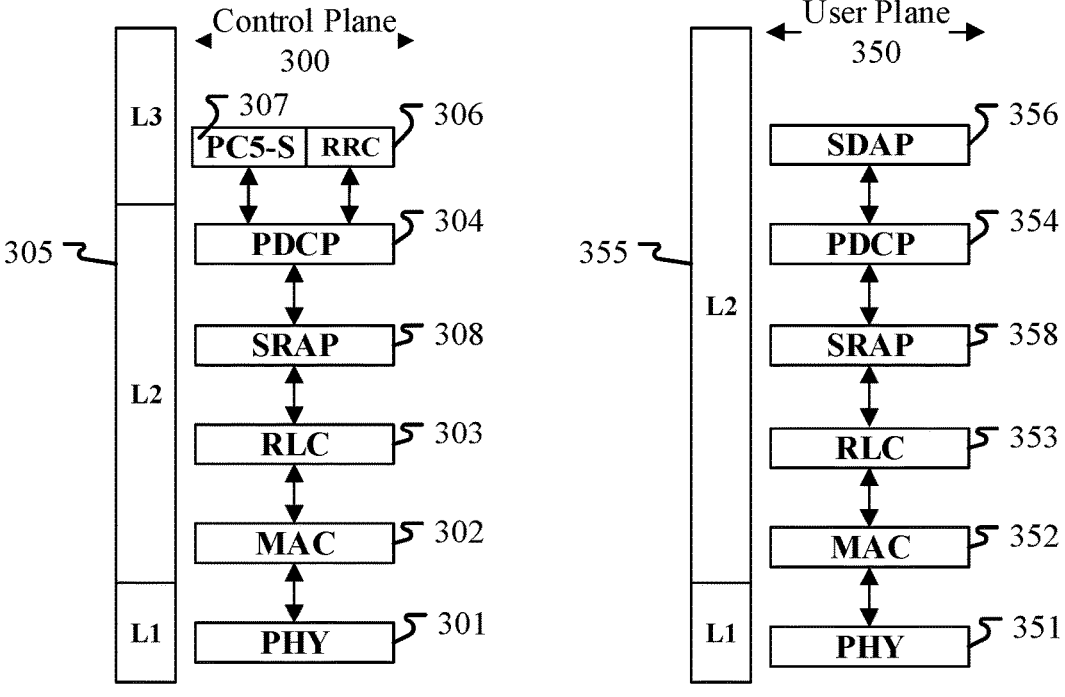
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. PC5 Signaling Protocol (PC5-S) sublayer 307 is responsible for the processing of signaling protocol at PC5 interface. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. SRB can be seen as a service or interface provided by the PDCP layer to a higher layer, such as the RRC layer. In NR system, SRB comprises SRB1, SRB2, SRB3, and when it comes to sidelink communications, there is also SRB4, which is respectively used to transmit different types of control signalings. SRB, a bearer between a UE and access network, is used to transmit a control signaling, comprising an RRC signaling, between UE and access network. SRB1 has special significance for a UE. After each UE establishes an RRC connection, there will be SRB1 used to transmit RRC signaling. Most of the signalings are transmitted through SRB1. If SRB1 is interrupted or unavailable, the UE must perform RRC reconstruction. SRB2 is generally used only to transmit an NAS signaling or signaling related to security aspects. UE cannot configure SRB3. Except for emergency services, a UE must establish an RRC connection with the network for subsequent communications. Although not described in the figure, the first node may comprise several higher layers above the L2 305. also comprises a network layer (i.e., IP layer) terminated at a P-GW 213 of the network side and an application layer terminated at the other side of the connection (i.e., a peer UE, a server, etc.). For UE involving relay service, its control plane can also comprise the adaptation sub-layer Sidelink Relay Adaptation Protocol (SRAP) 308, and its user plane can also comprise the adaptation sub-layer SRAP 358, the introduction of the adaptation layer helps lower layers, such as MAC layer, RLC layer, to multiplex and/or distinguish data from multiple source UEs. For nodes that do not involve relay communications, PC5-S 307, SRAP 308 and SRAP 358 are not required in the communication process.

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC 306.

In one embodiment, the second signaling in the present application is generated by the RRC 306.

In one embodiment, the first message in the present application is generated by the RRC 306 or the MAC 302 or the PHY 301.

In one embodiment, the first RRC message in the present application is generated by the RRC 306.

In one embodiment, the second message in the present application is generated by the RRC 306.

Embodiment 4

Figure 4:
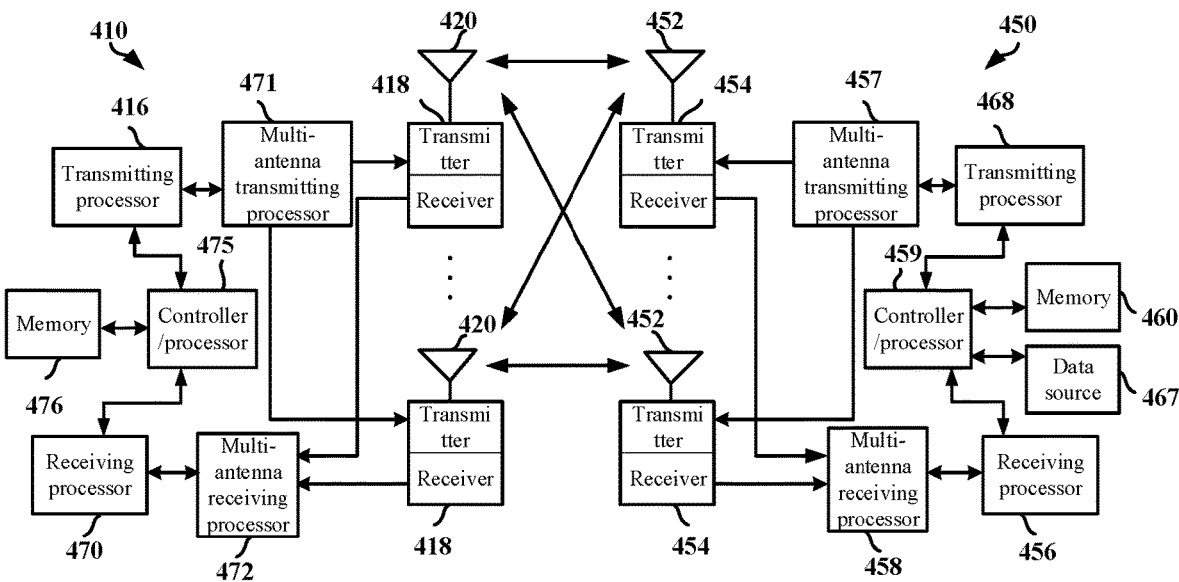
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, optionally may also comprise a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, optional can also comprise a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multiantenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multiantenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the LI layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first signaling, the first signaling is used to configure a first threshold;

as a response to any condition in a first condition set being satisfied, executes a first measurement; herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, the first communication device 450 comprises at least one processor and at least one memory. a memory that stores a computer readable instruction program. The computer readable instruction program generates an action when executed by at least one processor. The action includes: receiving a first signaling, the first signaling being used to configure a first threshold; as a response to any condition in a first condition set being satisfied, executing a first measurement; herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, the second communication device 410 comprises at least one processor and at least one memory. The at least one memory comprises computer program codes; the at least one memory and the computer program codes are configured to be used in collaboration with the at least one processor, the second communication device 410 at least: transmits a first signaling, the first signaling is used to configure a first threshold; a receiver of the first signaling, as a response to any condition in a first condition set being satisfied, executes a first measurement; herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, the second communication device 410 comprises a memory that stores a computer readable instruction program. The computer readable instruction program generates an action when executed by at least one processor. The action includes: transmitting a first signaling, the first signaling being used to configure a first threshold; a receiver of the first signaling, as a response to any condition in a first condition set being satisfied, executing a first measurement; herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, the first communication device 450 corresponds to a first node in the present application.

In one embodiment, the second communication device 410 corresponds to a second node in the present application. In one embodiment, the first communication device 450 is a UE.

In one embodiment, the first communication device 450 is a vehicle terminal.

In one embodiment, the second communication device 450 is a relay.

In one embodiment, the second communication device 410 is a satellite.

In one embodiment, the second communication device 410 is an aircraft.

In one embodiment, the second communication device 410 is a base station.

In one embodiment, the receiver 454 (comprising the antenna 452), the receiving processor 456 and the controller/processor 459 are used to receive the first signaling in the present application.

In one embodiment, the receiver 454 (comprising the antenna 452), the receiving processor 456 and the controller/processor 459 are used to receive the second signaling in the present application.

In one embodiment, the receiver 454 (comprising the antenna 452), the receiving processor 456 and the controller/processor 459 are used to receive the first message in the present application.

In one embodiment, the transmitter 454 (comprising antenna 452), the transmitting processor 468 and the controller/processor 459 are used to transmit the second message in the present application.

In one embodiment, the transmitter 418 (comprising the antenna 420), the transmitting processor 416 and the controller/processor 475 are used to transmit the first signaling in the present application.

In one embodiment, the transmitter 418 (comprising the antenna 420), the transmitting processor 416 and the controller/processor 475 are used to transmit the second signaling in the present application.

In one embodiment, the transmitter 418 (comprising the antenna 420), the transmitting processor 416 and the controller/processor 475 are used to transmit the first message in the present application.

In one embodiment, the receiver 418 (comprising the antenna 420), the receiving processor 470 and the controller/processor 475 are used to receive the second message in the present application.

Embodiment 5

Figures 5, 6:
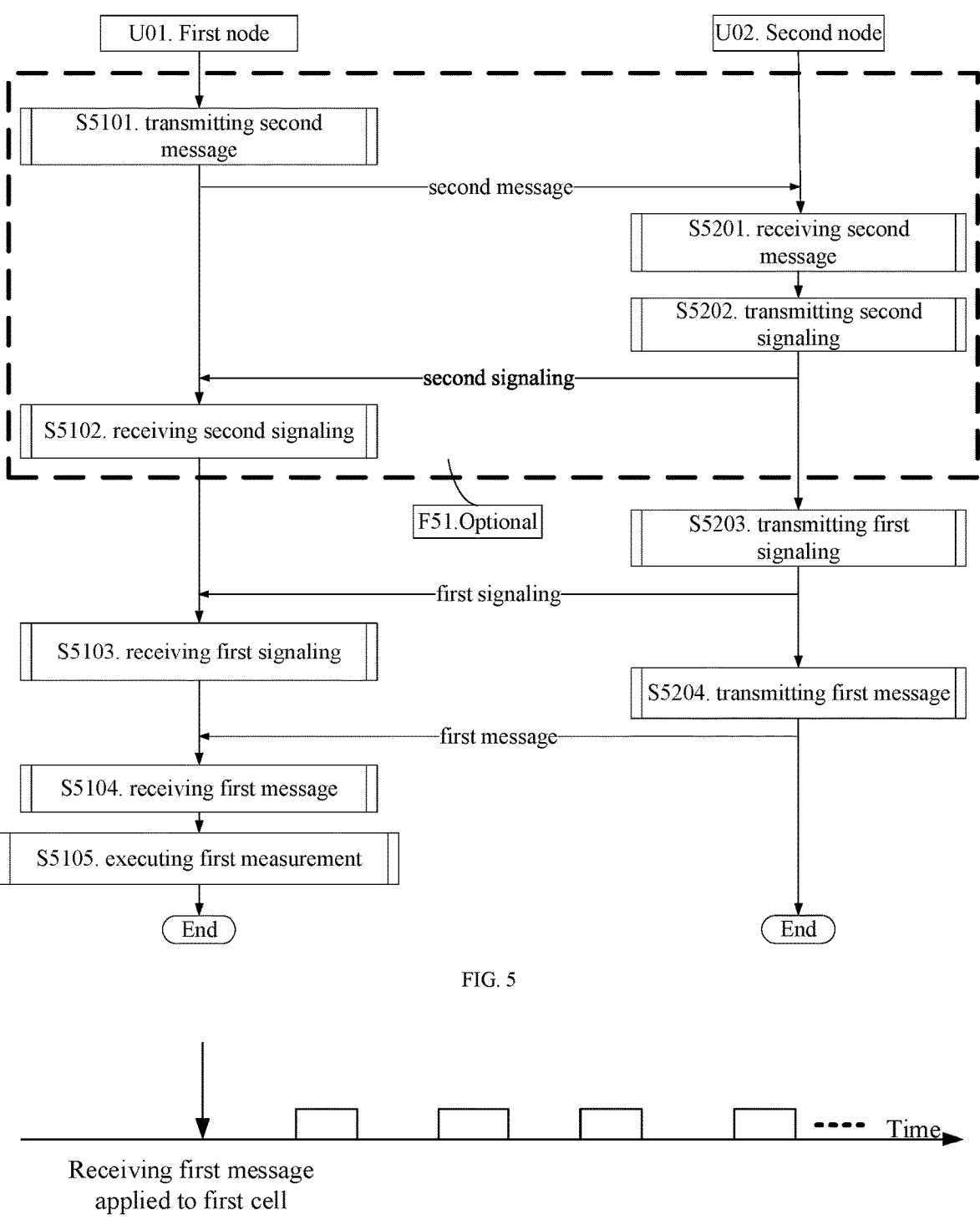
FIG. 5 illustrates a flowchart of radio signal transmission according to one embodiment of the present application.
FIG. 6 illustrates a schematic diagram of receiving a first message applied to a first cell according to one embodiment of the present application.

Embodiment 5 illustrates a flowchart of radio signal transmission according to one embodiment in the present application, as shown in FIG. 5. In FIG. 5, U01 corresponds to a first node in the present application, U02 corresponds to a second node in the present application. It is particularly underlined that the order illustrated in the embodiment does not put constraints over sequences of signal transmissions and implementations and steps in F51 are optional.

The first node U01 transmits a second message in step S5101; receives a second signaling in step S5102; receives a first signaling in step S5103; receives a first message in step S5104; executes a first measurement in step S5105.

The second node U02 receives a second message in step S5201; transmits a second signaling in step S5202; transmits a first signaling in step S5203; transmits a first message in step S5204.

In embodiment 5, the first signaling is used to configure a first threshold; the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, the second node U02 is an SpCell of the first node U01.

In one embodiment, the second node U02 is the first cell.

In one embodiment, the second node U02 is a base station corresponding to a PCell or PCell of the first node U01.

In one embodiment, a communication interface between the first node U01 and the second node U02 is a Uu interface.

In one embodiment, the second message is transmitted before the first message.

In one embodiment, the first message is transmitted after the first signaling.

In one embodiment, the second signaling is transmitted before the first message.

In one embodiment, the second signaling is transmitted before the first signaling or after the first signaling.

In one embodiment, the step S5105 is after the step S5104.

In one embodiment, the second message is an RRC message.

In one embodiment, the second message is used to indicate auxiliary information.

In one embodiment, when the second message is transmitted, the first cell is not applied the first message.

In one embodiment, the second message is used to indicate that the measurement relaxation state is true.

In one embodiment, a measurement relaxation state indicated by the second message depends on the first message.

In one embodiment, the second message is transmitted before receiving the first message, and the second message indicates that the measurement relaxation state is true.

In one embodiment, the second message is transmitted after receiving the first message, and the second message indicates that the measurement relaxation state is false.

In one embodiment, the first message is used to trigger the second message.

In one embodiment, the first message is used to change a measurement relaxation state of the first node U01.

In one embodiment, the first node U01 is in stationary state.

In one embodiment, quality of the first cell is good serving cell quality.

In one embodiment, the first message is repeated at least once.

In one embodiment, the first message is not specific to a specific terminal.

In one embodiment, the first message does not require feedback.

In one embodiment, the first node U01 can also transmit feedback for the first signaling.

In one embodiment, the feedback for the first signaling is an RRCReconfigurementComplete message.

In one embodiment, the second signaling is used for conditional reconfiguration.

In one subembodiment of the above embodiment, the conditional reconfiguration comprises CHO (conditional handover).

In one subembodiment of the above embodiment, the conditional reconfiguration comprises CPC (conditional PSCell Change).

In one subembodiment of the above embodiment, ConditionalReconfiguration comprised in the second signaling is used for the conditional reconfiguration.

In one subembodiment of the above embodiment, CondReconfigToAddModList in ConditionalReconfiguration comprised in the second signaling comprises at least one conditional reconfiguration.

In one embodiment, any conditional reconfiguration comprised in CondReconfigToAddModList comprised in ConditionalReconfigurement comprised in the second signaling comprises a condReconfigId and an execution condition, and the execution condition is or is associated with a MeasId and a condRRCReconfig.

In one embodiment, the second signaling comprises a first RRC message and a first measurement identity.

In one subembodiment of the above embodiment, the first RRC message is a conditional reconfiguration message (condRRCReconfig) of a conditional reconfiguration comprised in a CondReconfigToAddModList in ConditionalReconfiguration comprised in the second signaling.

In one subembodiment of the above embodiment, the first measurement identity is an execution condition (condRRCReconfig) of the confidition reconfiguration comprised in CondReconfigToAddModList in ConditionalReconfiguration comprised in the second signaling.

In one subembodiment of the above embodiment, the first measurement identity is a value of an execution condition (condRRCReconfig) of the confidition reconfiguration comprised in CondReconfigToAddModList in ConditionalReconfiguration comprised in the second signaling or a measurement identity associated with or corresponding to the execution condition.

In one embodiment, the first RRC message is an RRCReconfiguration message.

In one embodiment, the first RRC message is embedded in the second signaling.

In one embodiment, the first RRC message is embedded in a container of the second signaling.

In one embodiment, the receiving a second signaling comprises storing the first RRC message.

In one subembodiment of the embodiment, the first node U01 stores the first RRC message in a VarConditionalReconfig state variable.

In one embodiment, an execution condition corresponding to the first measurement identity being met is used to trigger an execution of the first RRC message.

In one subembodiment of the above embodiment, the first RRC message is not automatically executed upon being received.

In one subembodiment of the above embodiment, the first RRC message is not immediately executed upon being received.

In one subembodiment of the above embodiment, a measurement result of a measurement identified by the first measurement identity meets the first RRC message in certain conditions.

In one subembodiment of the above embodiment, an event of a report of a measurement identified by the first measurement identity being satisfied triggers an execution of the first RRC message.

In one subembodiment of the above embodiment, an event in the execution condition being satisfied triggers an execution of the first RRC message.

In one embodiment, an execution of the first RRC message depends on the first measurement identity.

In one subembodiment of the above embodiment, the first RRC message is not automatically executed upon being received.

In one subembodiment of the above embodiment, the first RRC message is not immediately executed upon being received.

In one subembodiment of the above embodiment, a measurement result of a measurement identified by the first measurement identity meets the first RRC message in certain conditions.

In one subembodiment of the above embodiment, an event of a report of a measurement identified by the first measurement identity being satisfied triggers an execution of the first RRC message.

In one embodiment, the meaning that an execution of the first RRC message depends on the first measurement identity comprises: when an event associated with the first measurement identity is satisfied, the stored first RRC message is executed.

In one subembodiment of the above embodiment, an event associated with the first measurement identity is an event in a report configuration associated with the first measurement identity.

In one subembodiment of the above embodiment, events associated with the first measurement identity comprise one of A3, A4, A5.

In one embodiment, whether the first message applied to the first cell is received is used to determine whether the event associated with the first measurement identity is satisfied.

In one embodiment, the first measurement is a measurement used for conditional reconfiguration.

In one embodiment, the first RRC message is used to modify an RRC connection.

In one embodiment, the first RRC message is used for handover.

In one embodiment, the first RRC message is used to configure SpCell.

Embodiment 6

Embodiment 6 illustrates a schematic diagram of receiving a first message applied to a first cell according to one embodiment of the present application, as shown in FIG. 6.

Each rectangle in FIG. 6 illustrates a transmitting mode or a cell state or a time when a configuration is in effect, and the present application does not limit the length and number of rectangles; the earliest one of the rectangles may begin upon reception of the first message applied to the first zone, or may begin after reception of the first message applied to the first zone; it may also start before a reception of a first message applied to the first zone, except that the first node is not aware of the first message when it is not received, and thus from the perspective of the first node, equivalently the earliest rectangle may start at the time of a reception of the first message applied to the first zone.

In one embodiment, at least one of the first signaling or the first message indicates at least one time window.

In one subembodiment of the embodiment, any of the at least one time window corresponds to a rectangle in FIG. 6.

In one subembodiment of the embodiment, the first signaling indicates that within the at least one time window, the first cell performs a transmission mode or a cell state or a configuration.

In one subembodiment of the embodiment, the first signaling indicates that only within the at least one time window, the first cell performs a transmission mode or a cell state or a configuration.

In one subembodiment of the embodiment, relative to not being in the at least one time window, the first cell performs, within the at least one time window, another transmit mode or cell state or a configuration.

In one subembodiment of the embodiment, the first cell is switched off from transmission in the at least one time window.

In one subembodiment of the embodiment, the first cell enters inactive state within the at least one time window.

In one subembodiment of the embodiment, the first cell is switched off or unavailable in the at least one time window.

In one subembodiment of the embodiment, the first cell is in a power saving or sleep mode within the at least one time window.

In one subembodiment of the embodiment, the first cell does not transmit a system information block within the at least one time window.

In one subembodiment of the embodiment, the first cell is not allowed to request a system information block within the at least one time window.

In one subembodiment of the embodiment, the first cell does not support random access within the at least one time window.

In one subembodiment of the embodiment, the first cell does not support dynamic scheduling within the at least one time window.

In one subembodiment of the embodiment, the first cell does not support dynamic scheduling based data transmission within the at least one time window.

In one subembodiment of the embodiment, the first cell is in the first state within the at least one time window.

In one subembodiment of the embodiment, the first signaling indicates that the at least one time window is not activated, or is in a de-activated state, and the first message is used to activate the at least one time window.

In one subembodiment of the embodiment, the first signaling indicates the at least one time window.

In one subembodiment of the embodiment, the first message indicates the at least one time window.

In one subembodiment of the embodiment, the first signaling and the first message indicates the at least one time window together.

In one subembodiment of the embodiment, the first time window is a part of time after receiving the first message.

In one subembodiment of the embodiment, the time window is all time after receiving the first message.

In one subembodiment of the embodiment, the first time window may be infinitely long.

In one subembodiment of the embodiment, the first message indicates a start moment of an earliest one of the at least one time window.

In one subembodiment of the embodiment, the first signaling indicates a start of an earliest one of the at least one time window.

In one subembodiment of the embodiment, the at least one time window only comprises one time window.

In one subembodiment of the embodiment, the at least one time window indicated by the first message only comprises one time window.

In one subembodiment of the embodiment, the at least one time window comprises multiple time windows.

In one subembodiment of the embodiment, the at least one time window indicated by the first signaling may comprise multiple time windows.

In one subembodiment of the embodiment, the first signaling indicates a period of the at least one time window.

In one subembodiment of the embodiment, each time window in the at least one time window comprises at least 1 ms.

In one subembodiment of the embodiment, each time window in the at least one time window comprises at least 40 ms.

In one subembodiment of the embodiment, each time window in the at least one time window comprises at least 5 ms.

In one subembodiment of the embodiment, each time window in the at least one time window comprises at least 10 ms.

In one subembodiment of the embodiment, each time window in the at least one time window comprises at least 20 ms.

In one subembodiment of the embodiment, each time window in the at least one time window comprises at least 640 ms.

In one subembodiment of the embodiment, each time window in the at least one time window comprises at least 160 ms.

In one subembodiment of the embodiment, each time window in the at least one time window comprises at least 320 ms.

In one embodiment, a transmission time of SIB1 is used to determine the at least one time window.

Embodiment 7

Embodiment 7 illustrates a schematic diagram of a transmission of a system information block according to one embodiment of the present application, as shown in FIG. 7.

In one embodiment, the system information block in the embodiment refers to SIB1.

In one embodiment, the system information block in the embodiment referred to refers to MIB (Master Information Block).

In one embodiment, the system information block in the embodiment refers to all system information blocks.

In one embodiment, when the first node does not receive the first message applied to the first cell, the first node considers that the first cell at least transmits a system information block within any time length.

In one embodiment, when the first message applied to the first cell is received, the first node considers that the first cell does not transmit a system information block within any first time length.

In one embodiment, when the first node does not receive the first message applied to the first cell, the first node considers that the first cell transmits or at least transmits X system information block(s) within any first time length, where X is a positive integer.

In one embodiment, when the first message applied to the first cell is received, the first node considers that the first cell transmits or at most transmits Y system information block(s) within any first time length, where Y is a positive integer.

In one embodiment, X is greater than Y.

In one embodiment, when the first node receives the first message applied to the first cell, the first node considers that the first cell at least transmits a system information block within any second time length.

In one embodiment, the first time length is greater than the second time length.

In one embodiment, the first time length is fixed.

In one embodiment, the first time length is 160 ms.

In one embodiment, the first time length is indicated by the network.

In one embodiment, the first time length is indicated by the first signaling.

In one embodiment, the first time length is indicated by SIB1.

In one embodiment, the second time length is indicated by the first signaling.

In one embodiment, the second time length is 320 ms or 640 ms.

In one embodiment, the second time length is longer than 160 ms.

In one embodiment, the second time length is indicated by the first message.

In one embodiment, the second time length is an integer multiple greater than 1 of the first time length.

Embodiment 8

Embodiment 8 illustrates a schematic diagram of whether a first message applied to a first cell is received is used to determine whether a measurement relaxation is applied according to one embodiment of the present application.

In one embodiment, after the first message applied to the first cell is received, the first node does not apply measurement relaxation.

In one embodiment, after the first message applied to the first cell is received, whether the first node applies measurement relaxation is unrelated to a first condition.

In one embodiment, the meaning of the phrase of whether the first node applies measurement relaxation is unrelated to a first condition comprises: even if the first condition is met, the first node does not apply measurement relaxation.

In one embodiment, before the first message applied to the first cell is received, whether the first node applies measurement relaxation depends on whether a first condition is met.

In one embodiment, the meaning of the phrase of whether the first node applies a measurement relaxation depends on whether a first condition is met comprises: when the first condition is met, the first node must or can apply measurement relaxation.

In one embodiment, the meaning of the phrase of whether the first node applies a measurement relaxation depends on whether a first condition is met comprises: when the first condition is not satisfied, the first node cannot apply measurement relaxation.

In one embodiment, the measurement relaxation comprises at least one of RLM measurement relaxation or BFD measurement relaxation.

In one embodiment, the first condition is that a difference value between SS-RSRP$_{Ref}$ and SS-RSRP is less than a third threshold, where SS-RSRP$_{Ref}$ is an SSB-based reference layer 3 RSRP measurement of the first cell; SS-RSRP is an SSB-based current layer 3 RSRP measurement for the first cell.

In one subembodiment of the embodiment, the third threshold is indicated by the first cell.

In one subembodiment of the embodiment, the third threshold is indicated by the network.

In one subembodiment of the embodiment, the first signaling is used to indicate the third threshold.

In one subembodiment of the embodiment, a value of SS-RSRP$_{Ref}$ depends on the SS-RSRP of the first cell.

In one subembodiment of the embodiment, an initial value of SS-RSRP$_{Ref}$ depends on the SS-RSRP of the first cell.

In one subembodiment of the embodiment, as a response to any condition being satisfied in a second condition set, SS-RSRP$_{Ref}$ is set to current SS-RSRP of the first cell.

In one subembodiment of the embodiment, the second condition set comprises at least (SS-RSRP-SS-RSRP$_{Ref}$)>0.

In one subembodiment of the above embodiment, the second condition set comprises at least the first condition not being satisfied within a third time length, and the third time length is configured by the network.

In one subembodiment of the above embodiment, the second condition set comprises at least the first condition not being satisfied within a third time length, and the third time length is configured by a first cell.

In one subembodiment of the above embodiment, the second condition set comprises at least the first condition not being satisfied within a third time length, and the third time length is configured by the first signaling.

In one subembodiment of the above embodiment, the first condition is a measurement relaxation criterion for low mobility.

In one embodiment, the first condition is that downlink radio link quality on configured reference signal resources is evaluated to be greater than the fourth threshold.

In one subembodiment of the embodiment, the fourth threshold is Q$_{in}$+X; the fourth threshold is measured by dB.

In one subembodiment of the above embodiment, Q$_{in}$ is defined in chapter 8.1 of 3GPP TS 38.133.

In one subembodiment of the above embodiment, X is a parameter for network configuration.

In one subembodiment of the above embodiment, X is configured by the first cell.

In one subembodiment of the above embodiment, X is configured by the first signaling.

In one subembodiment of the above embodiment, X is an offset.

In one embodiment, the first node is configured to report a measurement relaxation state.

In one embodiment, the first node supports measurement relaxation.

In one embodiment, after being configured, if the first node has the capability to measure relaxation against a cell group, then it should initiate a process that provides an indication of the relaxation state for RLM measurement.

In one embodiment, the first node is in RRC_CONNECTED state.

In one embodiment, when the measurement relaxation state changes and if the first node has the capability to measure relaxation against a cell group, then it should initiate a process that provides an indication of the relaxation state for RLM measurement.

In one embodiment, an application of measurement relaxation comprises executing measurements over a longer period of time.

In one embodiment, an application of measurement relaxation comprises a reduction in frequency of measurement execution.

In one embodiment, an application of measurement relaxation comprises not executing measurement.

Embodiment 9

Embodiment 9 illustrates a schematic diagram of whether a first message applied to a first cell is received is used to determine whether an event associated with a first measurement identity is satisfied according to one embodiment of the present application, as shown in FIG. 9.

In one embodiment, the event associated with a first measurement identity is an event indicated by report configuration identified by a report configuration identity associated with the first measurement identity.

In one embodiment, the event associated with a first measurement identity is an event indicated by CondTriggerConfig comprised in a report configuration identified by a report configuration identity associated with the first measurement identity.

In one embodiment, the event associated with a first measurement identity comprises at least one of CondEventA3, CondEventA5, CondEventA4, CondEventD1, and CondEventT1.

In one embodiment, the event associated with a first measurement identity is a reception of a first message applied to the first cell.

In one embodiment, the event associated with a first measurement identity is an application of a transmission mode or a cell state or configuration of the first cell.

In one embodiment, the event associated with a first measurement identity is that the first cell applies an application of another transmission mode or another cell state or configuration.

In one embodiment, the event associated with a first measurement identity is that the first cell is applied power saving.

In one embodiment, the event associated with a first measurement identity is that the first cell is applied inactive state.

In one embodiment, the event associated with a first measurement identity is that the first cell is applied the first state.

In one embodiment, the event associated with the first measurement identity is that the first cell reduces transmissions of signals.

In one embodiment, when a first message applied to the first cell is received, the event associated with a first measurement identity is satisfied.

In one embodiment, when a first message applied to the first cell is not received, the event associated with a first measurement identity is not satisfied.

In one embodiment, the meaning of the phrase of whether a first message applied to a first cell is received is used to determine whether an event associated with a first measurement identity is satisfied comprises: after a first message applied to the first cell is received, an event associated with a first measurement identity is more easily satisfied or triggered.

In one embodiment, the meaning of the phrase of whether a first message applied to a first cell is received is used to determine whether an event associated with a first measurement identity is satisfied comprises: after the first message applied to the first cell is received, a first parameter is applied to assess the event associated with a first measurement identity.

In one subembodiment of the embodiment, the first parameter is an offset.

In one subembodiment of the embodiment, the first parameter is indicated by the first message.

In one subembodiment of the embodiment, the first parameter is indicated by the first signaling.

In one subembodiment of the embodiment, the first parameter enables an assessment of the event associated with a first measurement identity easier to satisfy or easier to enter or trigger.

In one subembodiment of the embodiment, the first parameter is fixed.

In one subembodiment of the embodiment, the meaning of the phrase that the first parameter is applied to an assessment of the event associated with a first measurement identity comprises: during assessment, a threshold of the event associated with a first measurement identity is increased or decreased by the first parameter.

In one subembodiment of the embodiment, the meaning of the phrase that a fifth threshold is applied to an assessment of the event associated with a first measurement identity comprises: during assessment, the first parameter is used to determine a threshold for the event associated with the first measurement identity.

In one subembodiment of the embodiment, the first parameter is a value.

In one subembodiment of the embodiment, the first parameter is used to determine TimeToTrigger of the event associated with a first measurement identity.

In one subembodiment of the embodiment, the first parameter is used to shorten TimeToTrigger of the event associated with a first measurement identity.

In one subembodiment of the embodiment, the first parameter is hysteresis.

In one subembodiment of the embodiment, the first parameter is used to determine hysteresis of the event associated with a first measurement identity.

Embodiment 10

Embodiment 10 illustrates a structure block diagram of a processor in a first node according to one embodiment of the present application, as shown in FIG. 10. In FIG. 10, a processor 1000 in a first node comprises a first receiver 1001 and a first transmitter 1002. In Embodiment 10, the first receiver 1001 receives a first signaling, the first signaling is used to configure a first threshold;

the first receiver 1001 as a response to any condition in a first condition set being satisfied, executes a first measurement;

herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, the first message is used to indicate that the first cell stops data transmission based on dynamic scheduling within at least one time window.

In one embodiment, the first message is used to indicate that the first cell does not transmit a first system information block within at least one first time length;

herein, when the first message is not applied to the first cell, the first cell transmits the first system information block at least once within a first time length; the first system information block is system information block 1, or the first system information block is a main system information block.

In one embodiment, the first message is used to indicate that the first cell enters a network energy saving state.

In one embodiment, the first message is used to indicate that the first cell uses at least one of discontinuous transmission or discontinuous reception.

In one embodiment, the first receiver 1001 receives a second signaling, and the second signaling is used for conditional reconfiguration; the second signaling comprises a first RRC message and a first measurement identity; the receiving a second signaling comprises storing the first RRC message; an execution of the first RRC message depends on the first measurement identity;

herein, the meaning that an execution of the first RRC message depends on the first measurement identity comprises: when an event associated with the first measurement identity is satisfied, the stored first RRC message is executed; whether the first message applied to the first cell is received is used to determine whether the event associated with the first measurement identity is satisfied.

In one embodiment, whether the first message applied to the first cell is received is used to determine whether measurement relaxation is applied.

In one embodiment, the first node is a UE.

In one embodiment, the first node is a terminal that supports NTN.

In one embodiment, the first node is an aircraft or vessel.

In one embodiment, the first node is a mobile phone or vehicle terminal.

In one embodiment, the first node is a relay UE and/or U2N remote UE.

In one embodiment, the first node is an Internet of Things terminal or an Industrial Internet of Things terminal.

In one embodiment, the first node is a device that supports transmission with low-latency and high-reliability.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

Embodiment 11

Figure 11:
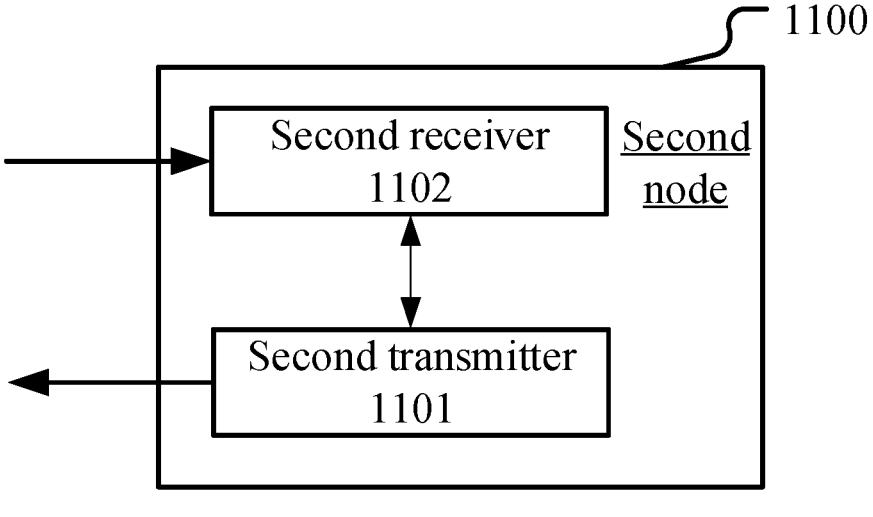
FIG. 11 illustrates a schematic diagram of a processor in a second node according to one embodiment of the present application.

Embodiment 11 illustrates a structure block diagram of a processor in a second node according to one embodiment of the present application, as shown in FIG. 11. In FIG. 11, a processor 1100 in a second node comprises a second transmitter 1101 and a second receiver 1102. In Embodiment 11, the second transmitter 1101 transmits a first signaling, the first signaling is used to configure a first threshold;

a receiver of the first signaling, as a response to any condition in a first condition set being satisfied, executes a first measurement;

herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received; the first cell is an SpCell; the first message is non-unicast, and/or, the first message is not supported by a legacy device.

In one embodiment, the second node is the first cell or a base station corresponding to the first cell.

In one embodiment, the first message is used to indicate that the first cell stops data transmission based on dynamic scheduling within at least one time window.

In one embodiment, the first message is used to indicate that the first cell does not transmit a first system information block within at least one first time length;

herein, when the first message is not applied to the first cell, the first cell transmits the first system information block at least once within a first time length; the first system information block is system information block 1, or the first system information block is a main system information block.

In one embodiment, the first message is used to indicate that the first cell enters a network energy saving state.

In one embodiment, the first message is used to indicate that the first cell uses at least one of discontinuous transmission or discontinuous reception.

In one embodiment, the first transmitter 1101 transmits a second signaling, and the second signaling is used for conditional reconfiguration; the second signaling comprises a first RRC message and a first measurement identity; an execution of the first RRC message depends on the first measurement identity;

herein, the meaning that an execution of the first RRC message depends on the first measurement identity comprises: when an event associated with the first measurement identity is satisfied, the stored first RRC message is executed; whether the first message applied to the first cell is received is used to determine whether the event associated with the first measurement identity is satisfied.

In one embodiment, whether the first message applied to the first cell is received is used to determine whether measurement relaxation is applied.

In one embodiment, the second node is a satellite.

In one embodiment, the second node is a base station.

In one embodiment, the second node is a relay.

In one embodiment, the second node is an access point.

In one embodiment, the second node is a node supporting multicast.

In one embodiment, the second transmitter 1101 comprises at least one of the antenna 420, the transmitter 418, the transmitting processor 416, the multi-antenna transmitting processor 471, the controller/processor 475 or the memory 476 in Embodiment 4.

In one embodiment, the second receiver 1102 comprises at least one of the antenna 420, the receiver 418, the receiving processor 470, the multi-antenna receiving processor 472, the controller/processor 475 or the memory 476 in Embodiment 4.

Embodiment 12

Figure 12:
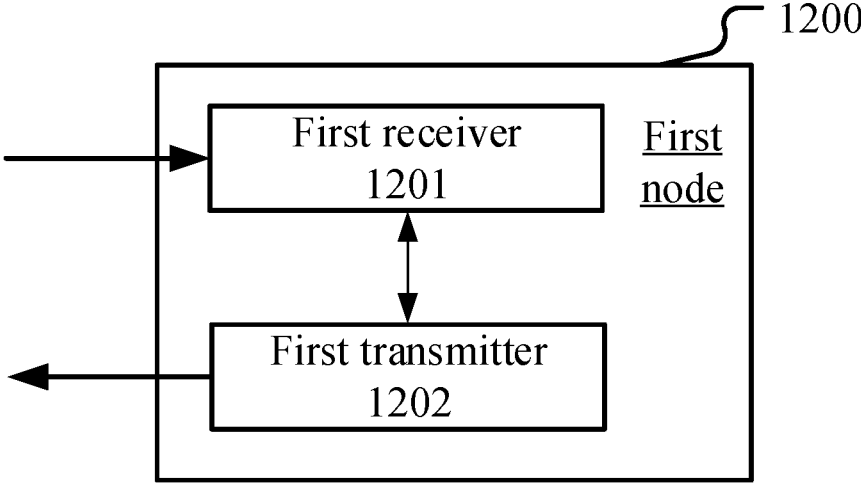
FIG. 12 illustrates a schematic diagram of a processor in a first node according to one embodiment of the present application.

Embodiment 12 illustrates a structure block diagram of a processor in a first node according to one embodiment of the present application, as shown in FIG. 12. In FIG. 12, a processor 1200 in a first node comprises a first receiver 1201 and a first transmitter 1202. In Embodiment 12, the first receiver 1201 receives a first signaling, the first signaling is used to configure a first threshold and a second threshold;

the first receiver 1201, as a response to any condition in a first condition set being satisfied, executes a first measurement;

herein, the first measurement comprises at least one of a layer 3 (L3) filtered beam measurement and a cell measurement; two conditions in the first condition set are that RSRP of a first cell after layer 3 filtering is lower than a first threshold and a first message applied to the first cell is received and RSRP of a first cell after layer 3 filtering is lower than the second threshold; the first cell is an SpCell; the first message is non-unicast, and/or, the first message is not supported by a legacy device.

In one embodiment, the second threshold is less than the first threshold.

In one embodiment, the first message is used to indicate that the first cell stops data transmission based on dynamic scheduling within at least one time window.

In one embodiment, the first message is used to indicate that the first cell does not transmit a first system information block within at least one first time length;

herein, when the first message is not applied to the first cell, the first cell transmits the first system information block at least once within a first time length; the first system information block is system information block 1, or the first system information block is a main system information block.

In one embodiment, the first message is used to indicate that the first cell enters a network energy saving state.

In one embodiment, the first message is used to indicate that the first cell uses at least one of discontinuous transmission or discontinuous reception.

In one embodiment, the first receiver 1201 receives a second signaling, and the second signaling is used for conditional reconfiguration; the second signaling comprises a first RRC message and a first measurement identity; the receiving a second signaling comprises storing the first RRC message; an execution of the first RRC message depends on the first measurement identity;

herein, the meaning that an execution of the first RRC message depends on the first measurement identity comprises: when an event associated with the first measurement identity is satisfied, the stored first RRC message is executed; whether the first message applied to the first cell is received is used to determine whether the event associated with the first measurement identity is satisfied.

In one embodiment, whether the first message applied to the first cell is received is used to determine whether measurement relaxation is applied.

In one embodiment, problems to be solved by the above methods include: how to trigger an execution of a first measurement; which conditions can trigger an execution of a first measurement; how to determine or trigger an execution of measurements based on a first threshold, and how to increase flexibility to meet multiple scenarios, e.g., measurements can also be performed even when RSRP of an SpCell is not less than a first threshold; how to determine to execute a measurement based on a reception of a first message applied to a first cell; how to improve the efficiency of a first message and how to reduce the impact of the first message on legacy users; how to save power; how to control an execution of measurements when the first message applied to a first cell is received.

In one embodiment, benefits of the above method include: increased flexibility, support for richer scenarios, power saving, reduced impact of measurements on communications, avoidance of dropped calls and service interruptions, improved efficiency of message transmission, and avoidance of interference with legacy users; when a first message applied to a first cell is received, the execution of the measurement is controlled, i.e. by means of a second threshold, more accurately and in a more targeted manner.

In one embodiment, the first node is a UE.

In one embodiment, the first node is a terminal that supports NTN.

In one embodiment, the first node is an aircraft or vessel.

In one embodiment, the first node is a mobile phone or vehicle terminal.

In one embodiment, the first node is a relay UE and/or U2N remote UE.

In one embodiment, the first node is an Internet of Things terminal or an Industrial Internet of Things terminal.

In one embodiment, the first node is a device that supports transmission with low-latency and high-reliability.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present application includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

This application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) comprising:
a transceiver; and
a processor operatively coupled to the transceiver,
wherein the transceiver and the processor are configured to:
receive a first signal comprising configuration information indicating a threshold, and
responsive to any condition in a condition set being satisfied, execute at least one of a layer 3 (L3) filtered beam measurement or a cell measurement,
wherein the condition set includes at least:
reference signal receiving power (RSRP) of a special cell (SpCell) after layer 3 filtering is lower than the threshold, and
a message for the SpCell cell is received wherein the message is at least one of non-unicast or not supported by a legacy device.

2. The UE according to claim 1, wherein the message further comprises information indicating that the SpCell stops data transmission based on dynamic scheduling within at least one time window.

3. The UE according to claim 1, wherein:
the message comprises information indicating that the SpCell does not transmit a first-system information block within at least one time length,
when the message is not applied to the SpCell cell, the UE receives the system information block at least once within a time length, and
the system information block is one of a system information block 1 (SIB-1) or a main system information block (SIB).

4. The UE according to claim 2, wherein:
the message comprises information indicating that the SpCell does not transmit the system information block within at least one time length,
when the message is not applied to SpCell, the UE receives the SIB-1 at least once within a time length, and
the system information block is one of system information block 1 (SIB-1) or a main system information block (SIB).

5. The UE according to claim 1, wherein the first message comprises information indicating that the SpCell is in a network energy saving state.

6. The UE according to claim 2, wherein the message comprises information indicating that the SPCell is in a network energy saving state.

7. The UE according to claim 3, wherein the message comprises information indicating that the SpCell is in enters-a network energy saving state.

8. The UE according to claim 1, wherein the message comprises information indicating that the SpCell operates in at least one of discontinuous transmission (DTX) or discontinuous reception (DRX).

9. The UE according to claim 2, wherein the message comprises information indicating that the SpCell operates in at least one of discontinuous transmission (DTX) or discontinuous reception (DRX).

10. The UE according to claim 3, wherein the message comprises information indicating that the SpCell operates in at least one of discontinuous transmission (DTX) or discontinuous reception (DRX).

11. The UE according to claim 1, wherein:

the transceiver and the processor are further configured to receive a second signal comprising:

information indicating a conditional reconfiguration a radio resource control (RRC) message, and information indicating a measurement identity, the transceiver and the processor are further configured to store the RRC message, execution of the stored RRC message is conditioned on the measurement identity, the processor is further configured to execute the stored RRC message when an event associated with the measurement identity is satisfied, and the processor is further configured to determine whether the event associated with the measurement identify is satisfied based on whether the first message for the SPCell is received.

12. The UEfirst node according to claim 2, wherein:

the transceiver and the processor are further configured to receive a second signal comprising:

information indicating a conditional reconfiguration, a radio resource control (RRC) message, and information indicating a measurement identity, the transceiver and the processor are further configured to store second signaling comprises storing the first RRC message, execution of the stored RRC message is conditioned on the measurement identity, the processor is further configured to execute the stored RRC message when an event associated with the measurement identity is satisfied, and;

the processor is further configured to determine whether the event associated with the measurement identify is satisfied based on whether the first message for the SPCell.

13. The UE according to claim 3, wherein:

the transceiver and the processor are further configured to receive a second signal comprising:

information indicating a conditional reconfiguration, a radio resource control (RRC) message, and information indicating a measurement identity, the transceiver and the processor are further configured to store the RRC message, execution of the stored RRC message is conditioned on the measurement identity, the processor is further configured to execute the stored RRC message when an event associated with the measurement identity is satisfied, and the processor is further configured to determine whether the event associated with the measurement identify is satisfied based on whether the first message for the SPCell is received.

14. The UE according to claim 8, wherein:

the transceiver and the processor are further configured to receive a second signal comprising:

information indicating a conditional reconfiguration, a radio resource control (RRC) message, and information indicating a measurement identity, the transceiver and the processor are further configured to store the RRC message, execution of the stored RRC message is conditioned on the measurement identity, the processor is further configured to execute the stored RRC message when an event associated with the measurement identity is satisfied, and the processor is further configured to determine whether the event associated with the measurement identify is satisfied based on whether the first message for the SPCell is received.

15. The UE according to claim 1, wherein the processor is further configured to determine whether to apply measurement relaxation based on receipt of the message for the SpCell.

16. The UE according to claim 11, wherein the processor is further configured to determine whether to apply measurement relaxation based on receipt of the message for the SpCell.

17. A method, implemented in a user equipment (UE), the UE comprising:

receiving a first signal comprising configuration information indicating a threshold; and responsive to any condition in a condition set being satisfied, executing at least one of a layer 3 filtered beam measurement or a cell measurement, wherein the condition set includes at least:

reference signal receiving power (RSRP) of a special cell (SpCell) after layer 3 filtering is lower than the threshold, and a message for the SpCell is received, wherein the message is at least one of non-unicast, or not supported by a legacy device.

18. The method in a first node according to claim 17, wherein the message further comprises information indicating that the SpCell stops data transmission based on dynamic scheduling within at least one time window.

19. The method in a first node according to claim 17, further comprising:

receiving a second signal comprising:

information indicating a conditional reconfiguration, a radio resource control (RRC) message, and information indicating a measurement identity, the method further comprises storing the RRC message, execution of the RRC message is conditioned on the first measurement identity, the method further comprises executing the stored RRC message when an event associated with the measurement identity is satisfied, and the method further comprises determining whether the event associated with the measurement identity is satisfied based on whether the message for the SpCell is received.

* * * * *